United States Patent
Tang et al.

(10) Patent No.: US 12,302,185 B2
(45) Date of Patent: May 13, 2025

(54) NETWORK CONNECTION CONTROL SYSTEM AND METHOD

(71) Applicant: Compal Electronics, Inc., Taipei (TW)

(72) Inventors: Dao-Wen Tang, Taipei (TW); Tsung-Hsuan Tsai, Taipei (TW); Yi-Ching Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 469 days.

(21) Appl. No.: 17/963,918

(22) Filed: Oct. 11, 2022

(65) Prior Publication Data

US 2024/0022987 A1 Jan. 18, 2024

Related U.S. Application Data

(60) Provisional application No. 63/389,097, filed on Jul. 14, 2022.

(30) Foreign Application Priority Data

Sep. 8, 2022 (TW) ................................. 111134121

(51) Int. Cl.
*H04W 36/30* (2009.01)
*H04W 48/20* (2009.01)

(52) U.S. Cl.
CPC ........... *H04W 36/30* (2013.01); *H04W 48/20* (2013.01)

(58) Field of Classification Search
CPC ..... H04W 36/30; H04W 48/20; H04W 24/08; H04W 24/10; H04W 24/02
See application file for complete search history.

(56) References Cited

U.S. PATENT DOCUMENTS

| 10,959,101 B2 | 3/2021 | Mohen Venkatakrishnan et al. |
| 11,514,134 B2 | 11/2022 | Ronagh et al. |

(Continued)

FOREIGN PATENT DOCUMENTS

| CA | 2840958 C | 1/2013 |
| CN | 111260109 A | 6/2020 |

(Continued)

OTHER PUBLICATIONS

Davide Venturelli et al., Reverse Quantum Annealing Approach to Portfolio Optimization Problems, arXiv:1810.08584, Oct. 25, 2018.

(Continued)

*Primary Examiner* — Marisol Figueroa
(74) *Attorney, Agent, or Firm* — KIRTON McCONKIE; Evan R. Witt

(57) ABSTRACT

A network connection control system and method is provided. The network connection control system includes user equipments, base stations, a server and a processing unit. Each base station has a connection range and is configured to connect the user equipment located within the connection range. Each user equipment transmits a network parameter between it and every base station through the base station connected therewith to the server. The server generates a QUBO matrix according to all the network parameters and outputs the QUBO matrix to the processing unit. The processing unit processes the QUBO matrix based on a quantum annealing algorithm to obtain an optimized connection configuration of the user equipments and base stations. The server receives the optimized connection configuration and controls the connection range of each base station accordingly for making an actual connection configuration of the user equipments and base stations identical with the optimized connection configuration.

19 Claims, 3 Drawing Sheets

(56) References Cited

U.S. PATENT DOCUMENTS

| | | | |
|---|---|---|---|
| 2018/0246851 A1 | 8/2018 | Zaribafiyan et al. | |
| 2019/0068443 A1 | 2/2019 | Li et al. | |
| 2019/0132066 A1 | 5/2019 | Park et al. | |
| 2020/0311591 A1 | 10/2020 | Bernoudy et al. | |
| 2020/0382361 A1 | 12/2020 | Chandrasekhar et al. | |
| 2021/0216897 A1 | 7/2021 | Woerner et al. | |
| 2021/0248489 A1 | 8/2021 | Yarkoni | |
| 2021/0335638 A1 | 10/2021 | Manassen et al. | |
| 2022/0012387 A1 | 1/2022 | Suzuki et al. | |
| 2022/0124508 A1 | 4/2022 | Geitz et al. | |
| 2023/0327969 A1* | 10/2023 | Saravanan | G06N 10/60 706/14 |
| 2024/0224063 A1* | 7/2024 | Saravanan | H04L 5/0062 |

FOREIGN PATENT DOCUMENTS

| | | |
|---|---|---|
| TW | 202117474 A | 5/2021 |
| TW | 202404414 A | 1/2024 |
| WO | 2020227721 A1 | 11/2020 |
| WO | 2021257128 A2 | 12/2021 |

OTHER PUBLICATIONS

Yue Xu et al., Load Balancing for Ultra-Dense Networks: A Deep Reinforcement Learning Based Approach, IEEE, Dec. 2019.

* cited by examiner

NETWORK CONNECTION CONTROL SYSTEM AND METHOD

CROSS-REFERENCE TO RELATED APPLICATION

This application claims the benefit of U.S. Provisional Application No. 63/389,097 filed on Jul. 14, 2022, and entitled "MOBILE NETWORK OPTIMIZE PROBLEM SOLVED BY QUANTUM ANNEALING ALGORITHM". This application also claims priority to Taiwan Patent Application No. 111134121 filed on Sep. 8, 2022. The entire contents of the above-mentioned patent applications are incorporated herein by reference for all purposes.

FIELD OF THE INVENTION

The present disclosure relates to a network connection control system and method, and more particularly to a network connection control system and method based on quantum annealing algorithm.

BACKGROUND OF THE INVENTION

The current 5G (the 5th generation mobile communication technology) RAN intelligent control usually deal with the MLB (mobility load balancing) problem of network through rule-based manner, which is also used in 4G network. When the rule-based manner is applied in the 4G network, the problem of too much connection device would not happen due to the limitation from the 4G network itself. However, in the 5G network, since the number of connection devices increases significantly, the rule design for the 5G network would become much more complicated and inefficient, and it is hard to take the load balancing of the overall network into consideration.

In addition, some prior arts may attempt to utilize the deep-learning-based manner to deal with the MLB problem. Although the deep-learning-based manner is sufficient to deal with the MLB problem under a specific network architecture, it also has obvious disadvantages. In detail, in the deep learning-based manner, the design process includes data collection, model training and model deployment. After a 5G field is built, the data collection and the model training are performed according to the number and distribution of the built base stations and the distribution of user equipments. However, if the 5G field is replaced or changed, the data collection and the model training have to be performed again, which limits the expandability of the deep-learning-based manner.

Therefore, there is a need of providing a network connection control system and method in order to overcome the drawbacks of the conventional technologies.

SUMMARY OF THE INVENTION

The present disclosure provides a network connection control system and method. In the network connection control system and method, a QUBO (quadratic unconstrained binary optimization) matrix is generated according to the network parameters between each user equipment and each base station. The QUBO matrix is processed based on the quantum annealing algorithm to obtain an optimized connection configuration of all the user equipments and all the base stations. The connection ranges of all the base stations are controlled to realize the optimized connection configuration. Accordingly, the network connection control system and method of the present disclosure is able to find out the currently optimal connection configuration at any time point so as to realize the load balancing of the overall network. Further, even when the network field is replaced or changed, there is no need to perform the data collection and the model training again, resulting in good expandability of the network connection control system and method of the present disclosure.

In accordance with an aspect of the present disclosure, a network connection control system is provided. The network connection control system includes a plurality of user equipments, a plurality of base stations, a server and a processing unit. Each base station has a connection range and is configured to connect with the user equipment located within the connection range. The server is in communication with the plurality of base stations. The processing unit is in communication with the server. Each of the plurality of user equipments transmits a network parameter between the user equipment and every one of the plurality of base stations through the base station connected therewith to the server. The server generates a QUBO matrix according to all the network parameters and outputs the QUBO matrix to the processing unit. The processing unit processes the QUBO matrix based on a quantum annealing algorithm to obtain an optimized connection configuration of the plurality of user equipments and the plurality of base stations. The server receives the optimized connection configuration and controls the connection range of each of the plurality of base stations according to the optimized connection configuration for making an actual connection configuration of the plurality of user equipments and the plurality of base stations identical with the optimized connection configuration.

In accordance with another aspect of the present disclosure, a network connection control method is provided. The network connection control method includes steps of: (a) providing a plurality of user equipments, a plurality of base stations, a server and a processing unit, wherein each of the plurality of base stations has a connection range and is configured to connect with the user equipment located within the connection range thereof, the server is in communication with the plurality of base stations, and the processing unit is in communication with the server; (b) controlling each of the plurality of user equipments to transmit a network parameter between the user equipment and every one of the plurality of base stations through the base station connected therewith to the server; (c) generating a QUBO matrix according to all the network parameters and outputting the QUBO matrix to the processing unit by the server; (d) processing the QUBO matrix based on a quantum annealing algorithm by the processing unit to obtain an optimized connection configuration of the plurality of user equipments and the plurality of base stations; and (e) receiving the optimized connection configuration and controlling the connection range of each of the plurality of base stations according to the optimized connection configuration by the server, so as to make an actual connection configuration of the plurality of user equipments and the plurality of base stations identical with the optimized connection configuration.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
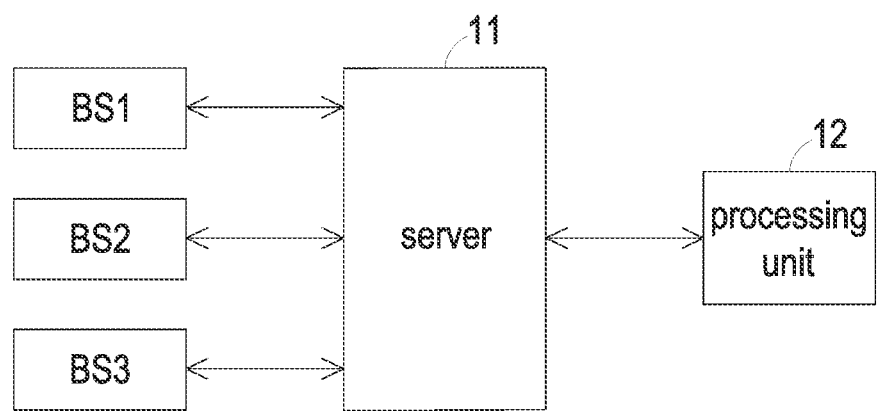
FIG. 1 is a schematic block diagram illustrating base stations, a server and a processing unit of a network connection control system according to an embodiment of the present disclosure.
Figure 2:
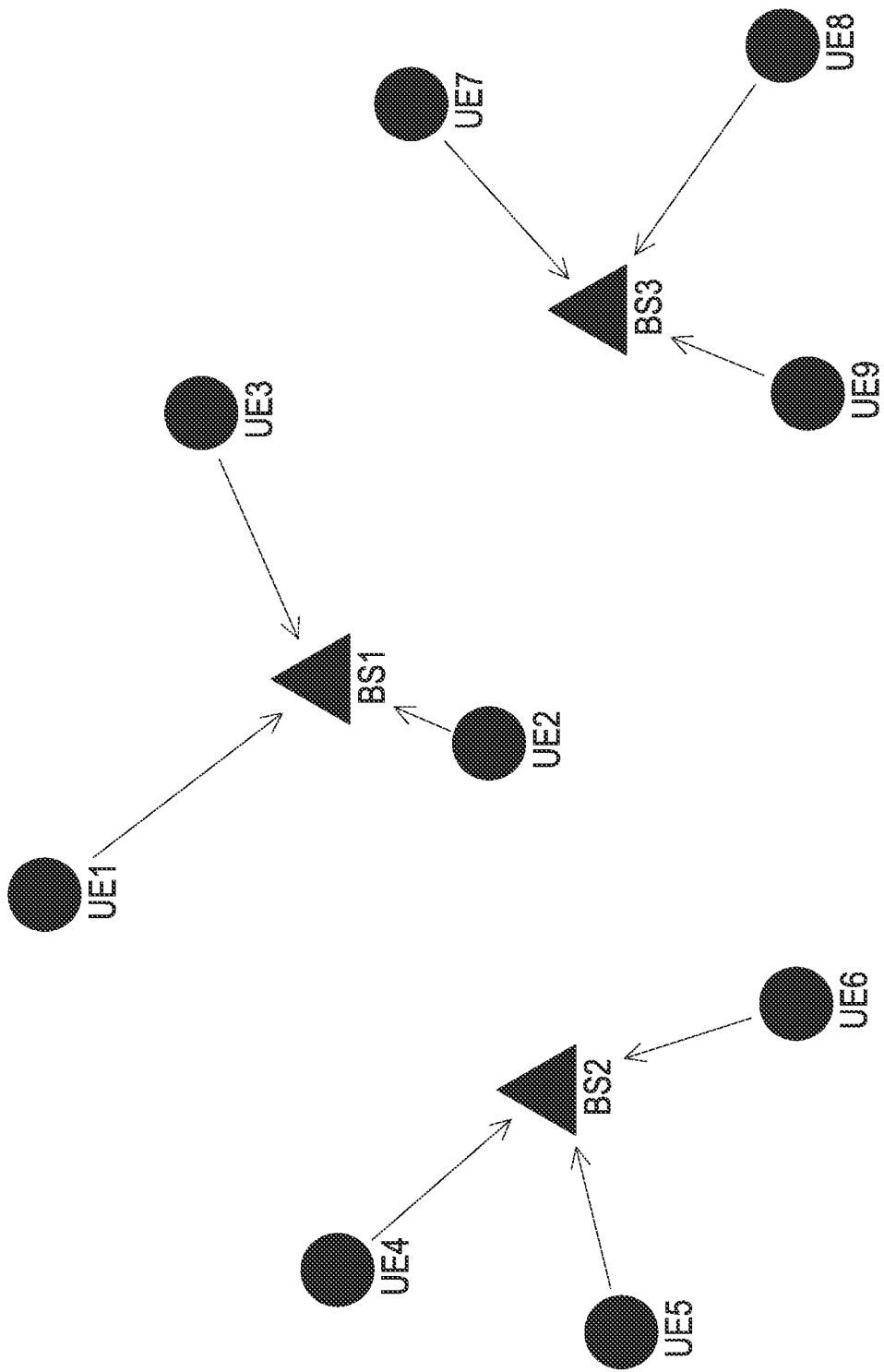
FIG. 2 is a schematic view illustrating base stations and user equipments of a network connection control system according to an embodiment of the present disclosure.

FIG. 1 is a schematic block diagram illustrating base stations, a server and a processing unit of a network connection control system according to an embodiment of the present disclosure. FIG. 2 is a schematic view illustrating base stations and user equipments of a network connection control system according to an embodiment of the present disclosure. As shown in FIG. 1 and FIG. 2, the network connection control system includes a plurality of user equipments, a plurality of base stations, a server 11 and a processing unit 12. Three base stations BS1, BS2 and BS3 and nine user equipments UE1, UE2, UE3, UE4, UE5, UE6, UE7, UE8 and UE9 are exemplified in FIG. 1 and FIG. 2, while the specific number of the user equipments and base stations is not limited thereto. Each base station has a connection range, and each base station is configured to connect with the user equipment located within the connection range thereof. The server 11 is in communication with all the base stations, and the processing unit 12 is in communication with the server 11.

There is a network parameter between any one user equipment and any one base station, and the network parameter includes the parameter which reflects the connection quality and/or the resource required for the connection between the user equipment and the base station. For example, the network parameter may include the number of resource blocks required for connecting the user equipment to the base station, the RSRP (reference signal received power) between the user equipment and the base station, and/or the SINR (signal to interference plus noise ratio) between the user equipment and the base station, but not limited thereto. Each user equipment transmits a network parameter between it and every base station through the base station connected therewith to the server 11. Taking the user equipment UE1 in FIG. 2 as an example, if the user equipment UE1 is currently connected to the base station BS1, the network parameter between the user equipment UE1 and the base station BS1, the network parameter between the user equipment UE1 and the base station BS2, and the network parameter between the user equipment UE1 and the base station BS3 are all transmitted through the base station BS1 to the server 11.

The server 11 generates a QUBO matrix according to all the network parameters, and outputs the QUBO matrix to the processing unit 12. The server 11 may include a CPU (central processing unit), a GPU (graphics processing unit) or a FPGA (field programmable gate array), but not exclusively. The processing unit 12 processes the QUBO matrix based on the quantum annealing algorithm to obtain an optimized connection configuration of all the user equipments and all the base stations. In the quantum annealing algorithm, the user equipment and the base station are served as binary variables. After the algorithm processes multiple iterations, the binary variable distribution with the lowest energy is obtained, which is the optimized connection configuration of all the user equipments and all the base stations. In addition, the used quantum annealing algorithm may include SA (simulated annealing), DA (digital annealing), SQA (simulated quantum annealing) or SBA (simulated bifurcation algorithm), but not limited thereto.

The connection configuration mentioned above includes the connection relations between each user equipment and each base station. In detail, each base station has fixed network resources that can be allocated, and the minimum unit for allocation is one resource block. For each base station, since the signal strength (SINR) of connecting to the base station is different for each user equipment, the amount of data transmitted between the base station and each user equipment by one resource block is also different. The optimized connection configuration mentioned above allows the user equipments in the overall network system to achieve the largest throughput with the fixed number of resource blocks.

FIG. 2 exemplifies a connection configuration. In the connection configuration shown in FIG. 2, the user equipments UE1, UE2 and UE3 are connected to the base station BS1, the user equipments UE4, UE5 and UE6 are connected to the base station BS2, and the user equipments UE7, UE8 and UE9 are connected to the base station BS3.

The server 11 receives the optimized connection configuration obtained by the processing unit 12, and controls the connection range of each base station according to the optimized connection configuration for making the actual connection configuration of all the user equipments and all the base stations identical with the optimized connection configuration. In an embodiment, each base station has a CIO (cell individual offset) value, which is proportional to the connection range (connectable radius). Namely, the higher the CIO value of the base station is, the larger the connection range of the base station is. Conversely, the lower the CIO value of the base station is, the smaller the connection range of the base station is. Consequently, the server 11 may control the connection range of each base station through adjusting the CIO value of each base station, thereby controlling the user equipment to connect to the designated base station.

Accordingly, the network connection control system and method of the present disclosure is able to find out the currently optimal connection configuration at any time point so as to realize the load balancing of the overall network. Further, even when the network field is replaced or changed, there is no need to perform the data collection and the model training again, resulting in good expandability of the network connection control system and method of the present disclosure.

In addition, after receiving all the network parameters, the server 11 converts the equations needed to be optimized into quadratic equations with binary variable, and sums them up to form an equation that considers all the variable factors. The formed equation is called a Hamiltonian equation of system and is broadly expressed as $\Sigma_{ij} q_{ij} x_i x_j$, where $i, j \in$ the number of binary variables, and q is a constant coefficient. Depending on the specific variable factors considered, the formed Hamiltonian equation may be different. A few implementations of Hamiltonian equation are exemplified as follows, but the formed Hamiltonian is not limited thereto.

In an embodiment, the server 11 considers the number of resource blocks required for connecting the user equipment to the base station to form a Hamiltonian equation, so as to let the total number of resource blocks used for connecting the user equipment in each base station has minimum standard deviation. Therefore, the load of the base stations may be the most balanced. The specific Hamiltonian equation H is exemplified as follows:

$$H = \sum_{j}^{m}\left[\sum_{i}^{n} w_i x_{ij} - \frac{1}{m}\sum_{k}^{m}\sum_{l}^{n} w_l x_{lk}\right]^2, \quad (1)$$

where x is a binary variable, and w is the coefficient of x. If the user equipment UEi is connected to the base station BSj, x is 1. Conversely, if the user equipment UEi is not connected to the base station BSj, x is 0. In this embodiment, the number of resource blocks may be included in the network parameter. Otherwise, the network parameter may include the SINR and RSRP, and the server 11 derives the number of resource blocks from the SINR and RSRP.

In an embodiment, the network parameter includes the SINR, and the server 11 considers the SINR between each user equipment and each base station to form a Hamiltonian equation. The SINR may be used to evaluate the throughput of the user equipment and the probability of radio link failure. Through forming the Hamiltonian equation based on the SINR, the transmission efficiency of each resource block may be the highest, namely the overall network transmission (i.e., the network transmission among all the user equipments and base stations) may have the highest transmission efficiency. The specific Hamiltonian equation H is exemplified as follows:

$$H = \sum_{j=1}^{J}\sum_{i=1}^{I}\left(\sum_{k=1}^{\overline{k}_{ij}} 10 t_{jk} + \sum_{k=0}^{2} 2^k d_{ijk} + 2 d_{ij3}\right) x_{ij} 156 C_{ij}/450 t_{slot}. \quad (2)$$

As the user equipment UEi is connected to the base station BSj, $C_{ij}$ is the capacity of each resource block transmitted therebetween, and $C_{ij}$ reflects the transmission efficiency of the resource block and may be derived from the SINR. $t_{slot}$ is the number of resource blocks which can be allocated to the user equipment by the base station. Therefore, according to the number of resource blocks $t_{slot}$ and the transmission efficiency of the resource block, the throughput can be figured out.

In an embodiment, when the network connection control system is applied to 5G network, the network parameter includes the RSRP, and the server 11 uses the A3 event of the measurement events in 5G network as a constraint to form the Hamiltonian equation. The A3 event represents that the base station connected to the user equipment is switched from the first base station to the second base station when the trigger condition is satisfied. For example, the trigger condition is that the RSRP between the user equipment and the first base station is smaller than the RSRP between the user equipment and the second base station. The specific constraint equation is exemplified as follows:

$$x_{ij} * (F_{ij} - F_{ij'}) > \left(\sum_{k=0}^{4} 2^k e_{j'jk} + 9 e_{j'j5} + 10\right), \quad (3)$$

where F is the coefficient of x, e is the binary variable of the CIO value, the value of Σe is between −10 and 10 (i.e., the adjustable range of the CIO value), and the base station BSj' is the base station that the user equipment UEi is currently connected to.

It is noted that the exemplified variable factors considered for forming the Hamiltonian equation can be combined arbitrarily, and the variable factor that may be considered in practical applications are not limited to the implementations stated above.

After expanding the Hamiltonian equation, all the $q_{ij}$ can be expressed as a matrix Q, and the Hamiltonian equation can be expressed as H=b·T*Q*b, where b is a binary variable vector, and the matrix Q is the QUBO matrix.

Figure 3:
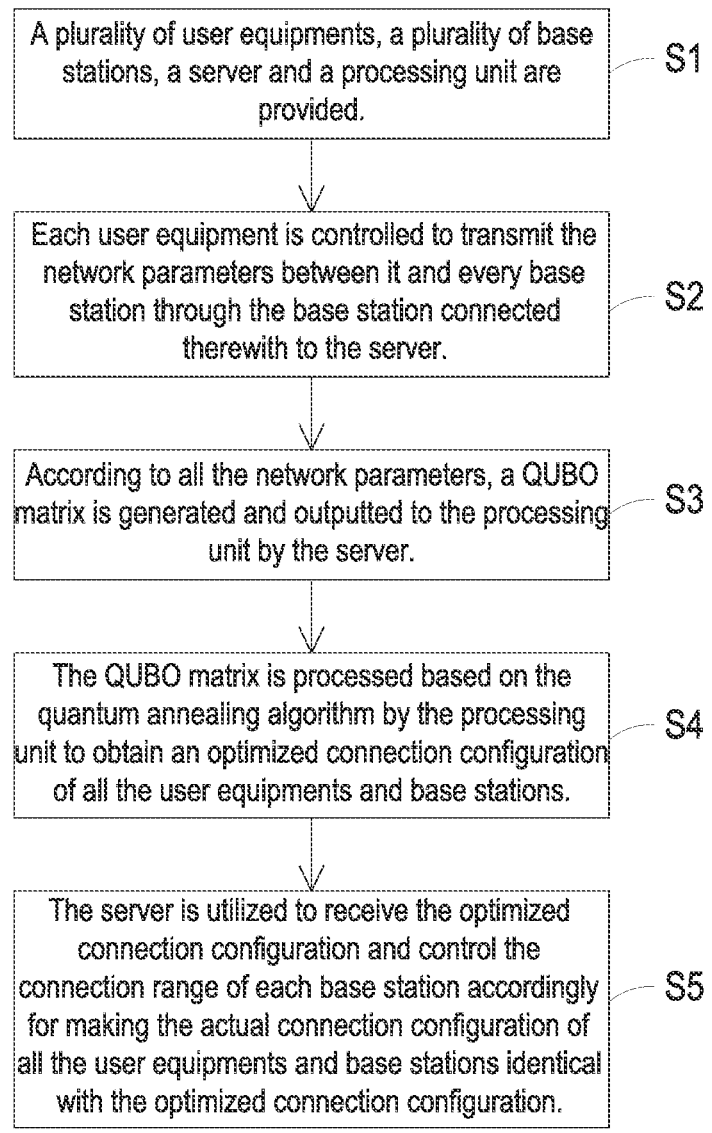
FIG. 3 is a schematic flow chart illustrating a network connection control method according to an embodiment of the present disclosure.

FIG. 3 is a schematic flow chart illustrating a network connection control method according to an embodiment of the present disclosure. The network connection control method is applicable to the network connection control system mentioned above. As shown in FIG. 3, the network connection control method includes the following steps.

First, in step S1, a plurality of user equipments, a plurality of base stations, a server 11 and a processing unit 12 are provided. Each base station has a connection range, and each base station is configured to connect with the user equipment located within the connection range thereof. The server 11 is in communication with all the base stations, and the processing unit 12 is in communication with the server 11.

Then, in step S2, each user equipment is controlled to transmit the network parameters between it and every base station through the base station connected therewith to the server 11.

Next, in step S3, according to all the network parameters, a QUBO matrix is generated and outputted to the processing unit 12 by the server 11.

Afterwards, in step S4, the QUBO matrix is processed based on the quantum annealing algorithm by the processing unit 12 to obtain an optimized connection configuration of all the user equipments and all the base stations.

Finally, in step S5, the server 11 is utilized to receive the optimized connection configuration and control the connection range of each base station according to the optimized connection configuration for making the actual connection configuration of all the user equipments and all the base stations identical with the optimized connection configuration.

In summary, the present disclosure provides a network connection control system and method. In the network connection control system and method, a QUBO (quadratic unconstrained binary optimization) matrix is generated according to the network parameters between each user equipment and each base station. The QUBO matrix is processed based on the quantum annealing algorithm to obtain an optimized connection configuration of all the user equipments and all the base stations. The connection ranges of all the base stations are controlled to realize the optimized connection configuration. Accordingly, the network connection control system and method of the present disclosure is able to find out the currently optimal connection configuration at any time point so as to realize the load balancing of the overall network. Further, even when the network field is replaced or changed, there is no need to perform the data collection and the model training again, resulting in good expandability of the network connection control system and method of the present disclosure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network connection control system, comprising:
a plurality of user equipments;
a plurality of base stations, each having a connection range and configured to connect with the user equipment located within the connection range;
a server in communication with the plurality of base stations; and
a processing unit in communication with the server,
wherein each of the plurality of user equipments transmits a network parameter between the user equipment and every one of the plurality of base stations through the base station connected therewith to the server, the server generates a QUBO (quadratic unconstrained binary optimization) matrix according to all the network parameters and outputs the QUBO matrix to the processing unit, the processing unit processes the QUBO matrix based on a quantum annealing algorithm to obtain an optimized connection configuration of the plurality of user equipments and the plurality of base stations, and the server receives the optimized connection configuration and controls the connection range of each of the plurality of base stations according to the optimized connection configuration for making an actual connection configuration of the plurality of user equipments and the plurality of base stations identical with the optimized connection configuration.

2. The network connection control system according to claim 1, wherein the network parameter comprises at least one of a number of resource blocks required for connecting the user equipment to the base station, an RSRP (reference signal received power) between the user equipment and the base station, and/or an SINR (signal to interference plus noise ratio) between the user equipment and the base station.

3. The network connection control system according to claim 2, wherein the network parameter comprises the number of resource blocks, the server outputs the QUBO matrix according to the number of resource blocks of all the network parameters, and under the optimized connection configuration, a total number of resource blocks used for connecting the user equipment in each of the plurality of base stations has a minimum standard deviation.

4. The network connection control system according to claim 2, wherein the network parameter comprises the SINR and the RSRP, the server derives the number of resource blocks from the SINR and the RSRP, the server outputs the QUBO matrix according to the number of resource blocks of all the network parameters, and under the optimized connection configuration, a total number of resource blocks used for connecting the user equipment in each of the plurality of base stations has a minimum standard deviation.

5. The network connection control system according to claim 2, wherein the network parameter comprises the SINR, the server outputs the QUBO matrix according to the SINR of all the network parameters, and under the optimized connection configuration, a network transmission among the plurality of user equipments and the plurality of base stations has highest transmission efficiency.

6. The network connection control system according to claim 2, wherein the network connection control system is applied to 5G network, the network parameter comprises the RSRP, the server uses an A3 event of measurement events in the 5G network as a constraint for the QUBO matrix, and the A3 event represents that the base station connected to the user equipment is switched from a first one of the plurality of base stations to a second one of the plurality of base stations when a trigger condition is satisfied.

7. The network connection control system according to claim 6, wherein the trigger condition is that the RSRP between the user equipment and the first one of the plurality of base stations is smaller than the RSRP between the user equipment and the second one of the plurality of base stations.

8. The network connection control system according to claim 1, wherein each of the plurality of base stations has a CIO (cell individual offset) value proportional to the connection range, and the server controls the connection range of the base station through adjusting the CIO value of the base station.

9. The network connection control system according to claim 1, wherein the processing unit comprises a CPU (central processing unit), a GPU (graphics processing unit) or a FPGA (field programmable gate array).

10. The network connection control system according to claim 1, wherein the quantum annealing algorithm used by the processing unit comprises SA (simulated annealing), DA (digital annealing), SQA (simulated quantum algorithm) or SBA (simulated bifurcation algorithm).

11. A network connection control method, comprising steps of:
(a) providing a plurality of user equipments, a plurality of base stations, a server and a processing unit, wherein each of the plurality of base stations has a connection range and is configured to connect with the user equipment located within the connection range thereof, the server is in communication with the plurality of base stations, and the processing unit is in communication with the server;
(b) controlling each of the plurality of user equipments to transmit a network parameter between the user equipment and every one of the plurality of base stations through the base station connected therewith to the server;
(c) generating a QUBO (quadratic unconstrained binary optimization) matrix according to all the network parameters and outputting the QUBO matrix to the processing unit by the server;
(d) processing the QUBO matrix based on a quantum annealing algorithm by the processing unit to obtain an optimized connection configuration of the plurality of user equipments and the plurality of base stations; and
(e) receiving the optimized connection configuration and controlling the connection range of each of the plurality of base stations according to the optimized connection configuration by the server, so as to make an actual connection configuration of the plurality of user equipments and the plurality of base stations identical with the optimized connection configuration.

12. The network connection control method to claim 11, wherein the network parameter comprises at least one of a number of resource blocks required for connecting the user equipment to the base station, an RSRP (reference signal received power) between the user equipment and the base station, and/or an SINR (signal to interference plus noise ratio) between the user equipment and the base station.

13. The network connection control method to claim 12, wherein the network parameter comprises the number of resource blocks, the server outputs the QUBO matrix according to the number of resource blocks of all the network parameters, and under the optimized connection configuration, a total number of resource blocks used for connecting the user equipment in each of the plurality of base stations has a minimum standard deviation.

14. The network connection control method to claim 12, wherein the network parameter comprises the SINR and the RSRP, the server derives the number of resource blocks from the SINR and the RSRP, the server outputs the QUBO matrix according to the number of resource blocks of all the network parameters, and under the optimized connection configuration, a total number of resource blocks used for connecting the user equipment in each of the plurality of base stations has a minimum standard deviation.

15. The network connection control method to claim 12, wherein the network parameter comprises the SINR, the server outputs the QUBO matrix according to the SINR of all the network parameters, and under the optimized connection configuration, a network transmission among the plurality of user equipments and the plurality of base stations has highest transmission efficiency.

16. The network connection control method to claim 12, wherein the network connection control system is applied to 5G network, and the network parameter comprises the RSRP, wherein in the step (c), the server is controlled to use an A3 event of measurement events in the 5G network as a constraint for the QUBO matrix, and the A3 event represents that the base station connected to the user equipment is switched from a first one of the plurality of base stations to a second one of the plurality of base stations when a trigger condition is satisfied.

17. The network connection control method to claim 16, wherein the trigger condition is that the RSRP between the user equipment and the first one of the plurality of base stations is smaller than the RSRP between the user equipment and the second one of the plurality of base stations.

18. The network connection control method to claim 11, wherein each of the plurality of base stations has a CIO (cell individual offset) value proportional to the connection range, and in the step (e), the server is utilized to control the connection range of the base station through adjusting the CIO value of the base station.

19. The network connection control method to claim 11, wherein in the step (d), the quantum annealing algorithm used by the processing unit comprises SA (simulated annealing), DA (digital annealing), SQA (simulated quantum algorithm) or SBA (simulated bifurcation algorithm).

* * * * *